US009733926B1

(12) United States Patent
Jibaly et al.

(10) Patent No.: US 9,733,926 B1
(45) Date of Patent: Aug. 15, 2017

(54) BRIDGE TO CONNECT AN EXTENDED DEVELOPMENT CAPABILITY DEVICE TO A TARGET DEVICE

(71) Applicant: Amazon Technologies, Inc., Seattle, WA (US)

(72) Inventors: Abdullah Mohammed Jibaly, Foothill Ranch, CA (US); Rahul Ravikumar, Irvine, CA (US)

(73) Assignee: Amazon Technologies, Inc., Reno, NV (US)

( * ) Notice: Subject to any disclaimer, the term of this patent is extended or adjusted under 35 U.S.C. 154(b) by 107 days.

(21) Appl. No.: 14/727,525

(22) Filed: Jun. 1, 2015

Related U.S. Application Data

(62) Division of application No. 13/799,654, filed on Mar. 13, 2013, now Pat. No. 9,047,404.

(51) Int. Cl.
   *G06F 9/44* (2006.01)
   *G06F 11/36* (2006.01)
   *G06F 9/445* (2006.01)

(52) U.S. Cl.
   CPC ............... *G06F 8/70* (2013.01); *G06F 8/60* (2013.01); *G06F 11/3692* (2013.01)

(58) Field of Classification Search
   CPC ............. G06F 11/0784; G06F 12/0246; G06F 12/1425; G06F 17/3087
   See application file for complete search history.

(56) References Cited

U.S. PATENT DOCUMENTS

| 6,002,871 | A  | * | 12/1999 | Duggan | G06F 11/3664 717/135 |
| 8,001,529 | B2 |   | 8/2011 | Babut et al. | |
| 2006/0101404 | A1 | * | 5/2006 | Popp | G06F 11/3688 717/124 |
| 2006/0107257 | A1 | * | 5/2006 | Ellison | G06F 9/45504 717/148 |
| 2009/0037881 | A1 | * | 2/2009 | Christy | G06F 11/3684 717/124 |

(Continued)

OTHER PUBLICATIONS

Ricardo Morla et al.; Evaluating a LocationBased Application A Hybrid Test and Simulation Environment; 2004 IEEE; pp. 48-56; <http://ieeexplore.ieee.org/stamp/stamp.jsp?arnumber=1321028>.*

(Continued)

*Primary Examiner* — Thuy Dao
*Assistant Examiner* — Cuong V Luu
(74) *Attorney, Agent, or Firm* — Baker & Hostetler LLP

(57) ABSTRACT

Techniques are disclosed for development of code for deployment on target devices within native code containers that provide access to native resources on the target devices. The native code containers on the target devices may provide only limited development capabilities. Thus, the disclosed development techniques may make use of a device that offers extended development capabilities in comparison to the native code containers on the target devices. A bridge may be established to connect an extended development capability device to a target device. The disclosed bridge may allow developers to benefit from extended development capabilities, while also enabling certain appropriate features to be tested on the target device in the environment in which they will eventually be used.

20 Claims, 7 Drawing Sheets

(56) References Cited

U.S. PATENT DOCUMENTS

| | | | | |
|---|---|---|---|---|
| 2012/0174075 | A1* | 7/2012 | Carteri | G06F 11/3688 717/127 |
| 2013/0007711 | A1 | 1/2013 | Fryc et al. | |
| 2013/0014086 | A1* | 1/2013 | McFadden | G06F 9/45516 717/125 |
| 2013/0191815 | A1* | 7/2013 | Davis | G06F 9/45508 717/129 |
| 2013/0219369 | A1* | 8/2013 | Rector | G06F 11/362 717/127 |
| 2014/0237451 | A1* | 8/2014 | Koneru | G06F 11/3688 717/124 |

OTHER PUBLICATIONS

Ilker Hamzaoglu et al.; Reducing Test Application Time for Full Scan Embedded Cores; 1999 IEEE; 8 pages; <http://ieeexplore.ieee.org/stamp/stamp.jsp?arnumber=781060>.*

Hisao Ishibuchi et al.; A Multi-Objective Genetic Local Search Algorithm and Its Application to Flowshop Scheduling; 1998 IEEE; pp. 392-403; <http://ieeexplore.ieee.org/stamp/stamp.jsp?arnumber=704576>.*

Harald Raffelt et al.; Hybrid Test of Web Applications with Webtest ; 2008 ACM; 7 pages; <http://dl.acm.org/citation.cfm?id=1390833& CFID=748685980&CFTOKEN=72434575>.*

Ibrahim Anka Salihu et al.; Systematic Exploration of Android Apps' Events for Automated Testing; 2016 ACM; 5 pages; <http://dl.acm.org/citation.cfm?id=3011072&CFID=748685980&CFTOKEN=72434575>.*

Clemens Holzmann et al.; Multivariate Testing of Native Mobile Applications; 2014 ACM; 10 pages; <http://dl.acm.org/citation.cfm?id=2684119&CFID=748685980&CFTOKEN=72434575>.*

Ashwin Manhunatha et al.; Power of Clouds in Your Pocket: An Efficient Approach for Cloud Mobile Hybrid Application Development ; 2010 IEEE; pp. 496-503; <http://ieeexplore.ieee.org/stamp/stamp.jsp?tp=arnumber=5708-492>.

Yongguang Zhang et al.; An integrated enviroment for testing mobile ad-hoc networks; 2002 ACM: pp. 104-111; <http://dl.acm.org/citation.cfm?id=513813>.

Hans Utz et al.; Miro Middleware for Mobile Robot Application; 2002 IEEE; pp. 492-497; <http://ieeexplore.ieee.org/stamp/stamp.jsp?tp=&arnumber=1044362>.

Peter Frizson; Generalized algorithmic debugging and testing; 1991 ACM; pp. 317-326; <http://dl.acm.org/citation.cfm?id=113472>.

Anouck R. Girarg et al.; Real-Time Hybrid Control of Mobile Offshore Base Scaled Models; 2000 AACC; pp. 682-686.

Henrik Thane et al.; Replay Debugging of Real-Time Systems Using Time Machines; 2003 IEEE; 8 pages.

* cited by examiner

BRIDGE TO CONNECT AN EXTENDED DEVELOPMENT CAPABILITY DEVICE TO A TARGET DEVICE

CROSS-REFERENCE TO RELATED APPLICATIONS

This application is a divisional of U.S. patent application Ser. No. 13/799,654 filed on Mar. 13, 2013, the disclosure of which is hereby incorporated herein by reference in its entirety.

BACKGROUND

As more new and diverse types of computing devices become increasingly popular, the development of applications for such devices becomes increasingly challenging. As an example, many mobile devices now commonly employ hybrid mobile applications, which are a cross between native mobile device applications and web-based applications. In particular, similar to web-based applications, hybrid mobile applications may employ a common code base that works across multiple different platforms and/or operating systems. Additionally, similar to native mobile device applications, hybrid mobile applications may interact with a variety of native device resources such as the camera, notifications, contacts, calendar and various communication capabilities. Hybrid mobile applications typically execute the common code base from within a native code container that provides access to the native resources on the mobile device.

Hybrid mobile application functionality may be developed by executing test code directly on mobile devices. This enables, for example, the hybrid mobile application functionality to interact with native mobile device resources and to be tested in an environment that is similar to the environment in which the final developed functionality will eventually be used. However, the native code containers on the mobile devices typically provide only limited capabilities for testing and development of hybrid mobile applications. For example, to debug an error resulting from hybrid mobile application test code execution, the native code containers often require a developer to repeatedly perform procedures such as insertion of log messages, recompilation of code and generation of printouts. Each instance of recompilation of code may take an average of three to four minutes or longer in certain circumstances.

BRIEF DESCRIPTION OF THE DRAWINGS

The following detailed description may be better understood when read in conjunction with the appended drawings. For the purposes of illustration, there is shown in the drawings example embodiments of various aspects of the disclosure; however, the invention is not limited to the specific methods and instrumentalities disclosed.

DETAILED DISCLOSURE

In general, this disclosure describes techniques for development of code for deployment on target devices within native code containers that provide access to native resources on the target devices. For example, code may be developed for a hybrid mobile application for deployment within native web code containers on mobile devices. The native code containers on the target devices may provide only limited development capabilities. Thus, the disclosed development techniques may make use of a device that offers extended development capabilities in comparison to the native code containers on the target devices. An extended development capability device may be, for example, a desktop or laptop computer executing a full feature web browser. A bridge may be established to connect an extended development capability device to a target device. The disclosed bridge may allow developers to benefit from extended development capabilities, while also enabling certain appropriate features to be tested on the target device in the environment in which they will eventually be used.

As an example, the disclosed techniques may be employed by initiating the execution of test code on the extended development capability device. The test code may include certain designated bridge instructions, which are instructions that are intended for execution on the target device. A test code interception module on the extended development capability device may be employed to identify and intercept the bridge instructions. The test code interception module may then route the bridge instructions to the target device over the established bridge for execution by the target device. The remaining non-bridge instructions are not sent over the bridge and are executed locally by the extended development capability device. After the bridge instructions have been executed on the target device, results of the execution may be returned back over the bridge to the extended development capability device. Thus, the bridge allows the bridge instructions to be executed by the target device, while also allowing the remaining non-bridge instructions to be executed locally by the extended development capability device.

Figure 1:
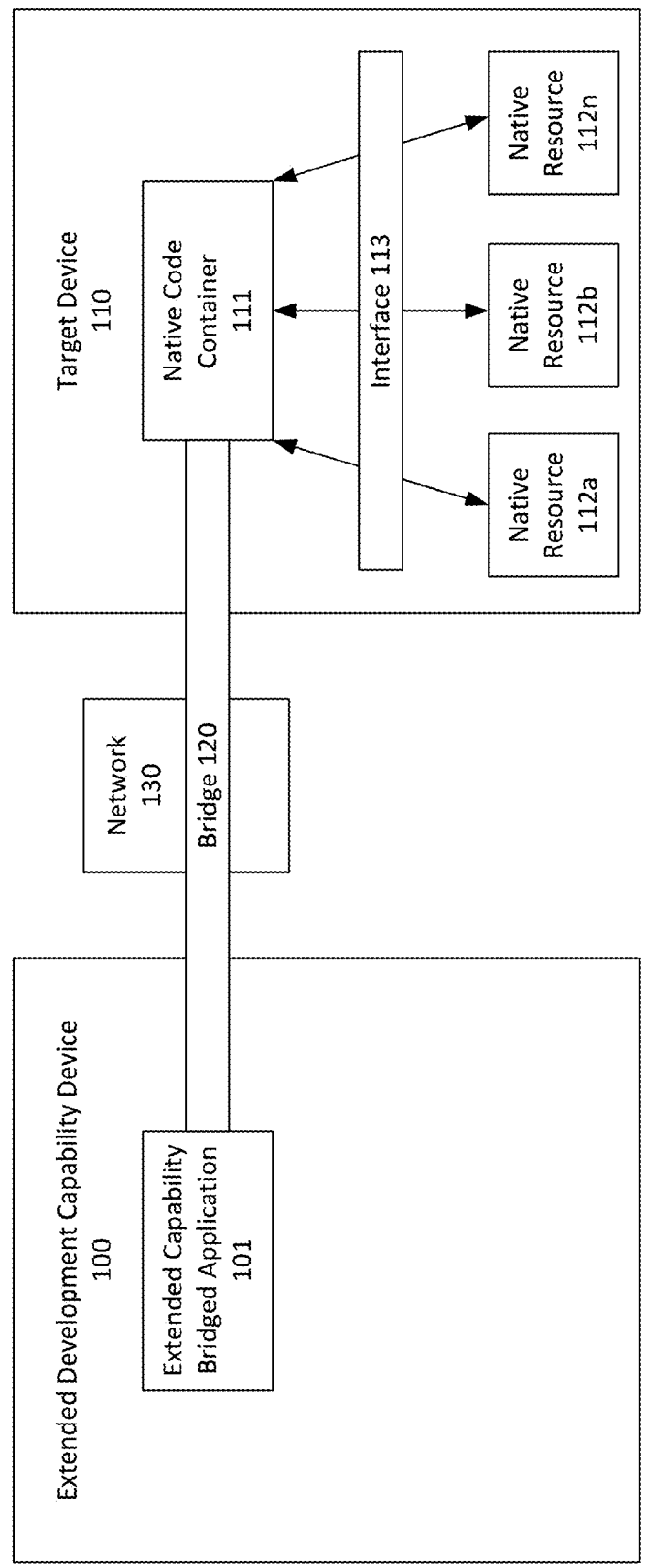
FIG. 1 is a diagram illustrating an example application development environment in accordance with the present disclosure.

FIG. 1 illustrates one example embodiment of an application development environment in accordance with the present disclosure. An extended development capability device 100 is connected to a target device 110 using a bridge 120. As set forth above, the extended development capability device 100 may be, for example, a desktop or laptop computer, while the target device 110 may be, for example, a mobile device such as a smart phone or tablet. Depending upon the scenarios in which they are employed, extended development capability device 100 and target device 110 may, in some cases, have few, if any, common characteristics. For example, extended development capability device 100 and target 110 may execute different operating systems and may be distributed by different manufacturers.

Although only a single target device 110 is shown in FIG. 1, the extended development capability device 100 may be simultaneously bridged to any number of target devices 110 using additional bridges 120. Once again, depending upon the scenarios in which they are employed, each of the simultaneously bridged target devices 110 may have few, if any, common characteristics. For example, each of the simultaneously bridged target devices 110 may execute different operating systems and may be distributed by different manufacturers.

Extended development capability device 100 executes an extended capability bridged application 101, while target device 110 executes native code container 111. As examples, extended capability bridged application 101 may be a full feature web browser application, while native code container 111 may be a native web code container for a hybrid mobile application. As set forth above, hybrid mobile applications may provide advantages such as a common code base that works across multiple different platforms and/or operating systems as well as the ability to interact with a variety of native device resources such as the camera, notifications, contacts, calendar and various communication capabilities. For example, hybrid mobile applications may employ combinations of common programming languages such as JavaScript, cascading style sheets (CSS) and hypertext markup language (HTML). In order to provide such advantages, hybrid mobile applications typically execute their common code base from within a native web code container that provides access to the native resources on the mobile device.

Thus, while native web code containers may provide certain advantages to hybrid mobile applications, they may also limit certain capabilities of the hybrid mobile applications. As an example, on many platforms, the available native web code containers do not provide equivalent capabilities in comparison to full feature web browsers. This may cause significant complications associated with operations such as debugging of the hybrid mobile applications during the application development process. For example, full feature web browsers often allow a particular problem to be debugged by simply setting a breakpoint at a corresponding instruction within the test code. By contrast, debugging of the same problem using a native web code container may often require, for example, generation of log messages at necessary locations, recompilation of the necessary code and generation of a printout of the relevant information. All or portions of this process may then need to be repeated as necessary until the problem is corrected, with each recompilation process possibly averaging several minutes for completion.

In addition to native code container 111, target device 110 includes a number of native resources 112a-n. As examples, resources 112a-n may include resources such as the camera, notifications, contacts, calendar and various communication capabilities. In some cases, native code container 111 may include functionality that is not developed specifically for target device 110. For example, if native code container 111 is a hybrid mobile application, then it may employ a common code base that works across multiple different platforms and/or operating systems. Thus, while native code container 111 may be capable of using and interacting with resources 112a-n, an interface layer 113 may be required in order to enable such use and interaction. Interface layer 113 may, for example, enable a web-to-native abstraction from native code container 111 to native resources 112a-n. As should be appreciated, in some cases, interface layer 113 may not be necessary for interaction with any or all of native resources 112a-n.

As set forth above, bridge 120 may be employed to develop functionality that, upon completion of the development process, may be executed on devices similar to target device 110. Thus, the bridge 120 may allow developers to benefit from the extended development capabilities of the extended development capability device 100, while also enabling certain appropriate features to be tested on the target device 110 in the environment in which they will eventually be used. In some cases, the extended development capabilities provided by extended development capability device 100 may be quite significant in comparison to those provided by native code container 111.

While extended development capability device 100 may offer advantageous testing and development capabilities in comparison to native code container 111, the target device 110 may also be advantageous in the sense that it provides an execution environment that is similar to the environment in which the developed functionality will, upon execution, eventually be deployed. Thus, there may be considerable advantages to being able to test at least a portion of the developed functionality on the target device 110. For example, consider the scenario in which an element of the developed functionality involves the ability to send a text message. While mobile devices are commonly employed to send text messages, desktops and laptops are not typically provided with texting functionality. In this scenario, bridge 120 may provide the ability to generate and modify test code on extended development capability device 100, while also testing the texting functionality on the target device 110, which may provide an environment similar to that in which the functionality is eventually expected to be used.

Continuing with the example of a text message, when execution of the test code reaches a point where text messaging is performed, the instructions to generate and send a text message may be sent from the extended development capability device 100 to the target device 110 using bridge 120. The target device 110 may then attempt execution of the text message and return results of this attempt back to the extended development capability device 100 once again using the bridge 120. For example, if the text message is sent successfully, then the success of the attempt may be reported back to the extended development capability device 100. By contrast, if the text message could not be sent, then the failure of the attempt may instead be reported back to the extended development capability device 100.

If a problem or failure is detected with one or more operations at the target device 110, then the extended development capability device 100 may in some cases be used to debug the problematic operations. For example, consider the scenario in which a necessary prerequisite to sending a text message is the need to identify a respective network service carrier for the device to which the text message is being sent. The example scenario could include logic to match certain telephone number prefixes with certain carriers. If, for example, there was a problem with this logic and the carriers were not properly identified, then the text message could not be sent. In this and other example scenarios, the target device 110 may allow a problem to be detected, while the extended development capability device 100 may then provide the ability to debug and find a solution for the detected problem.

As set forth above, the extended development capability device 100 may allow extended testing and development features such as, for example, the use of breakpoints. Continuing once again with the texting example, extended development capability device 100 may allow, for example, breakpoints to be inserted at the portions of code in which number prefixes were matched to certain carriers. By contrast, debugging of such a problem at the target device 110 might require multiple log messages, recompilations and generations of printouts as set forth above.

Thus, bridge 120 enables communications between bridged extended capability application 101 and native code container 111. As an example, bridge 120 may be a transport control protocol (TCP) socket bridge connection. However, bridge 120 may be generated using any appropriate connection that allows instructions or commands and corresponding results or other necessary messages to be communicated between extended capability bridged application 101 and native code container 111. As should be appreciated, bridge 120 need not necessarily provide a direct communication path between bridged application 101 and container 111. For example, communications between application 101 and container 111 may pass through any number of communication processing, security and/or other additional modules. Network 130 may be any appropriate communications network such as, for example, a local area network (LAN) or a wide area network (WAN) such as the Internet. Bridge 120 may also be disconnected and reconnected any number of times as necessary due to, for example, device and/or network malfunctions or other issues.

Figure 2:
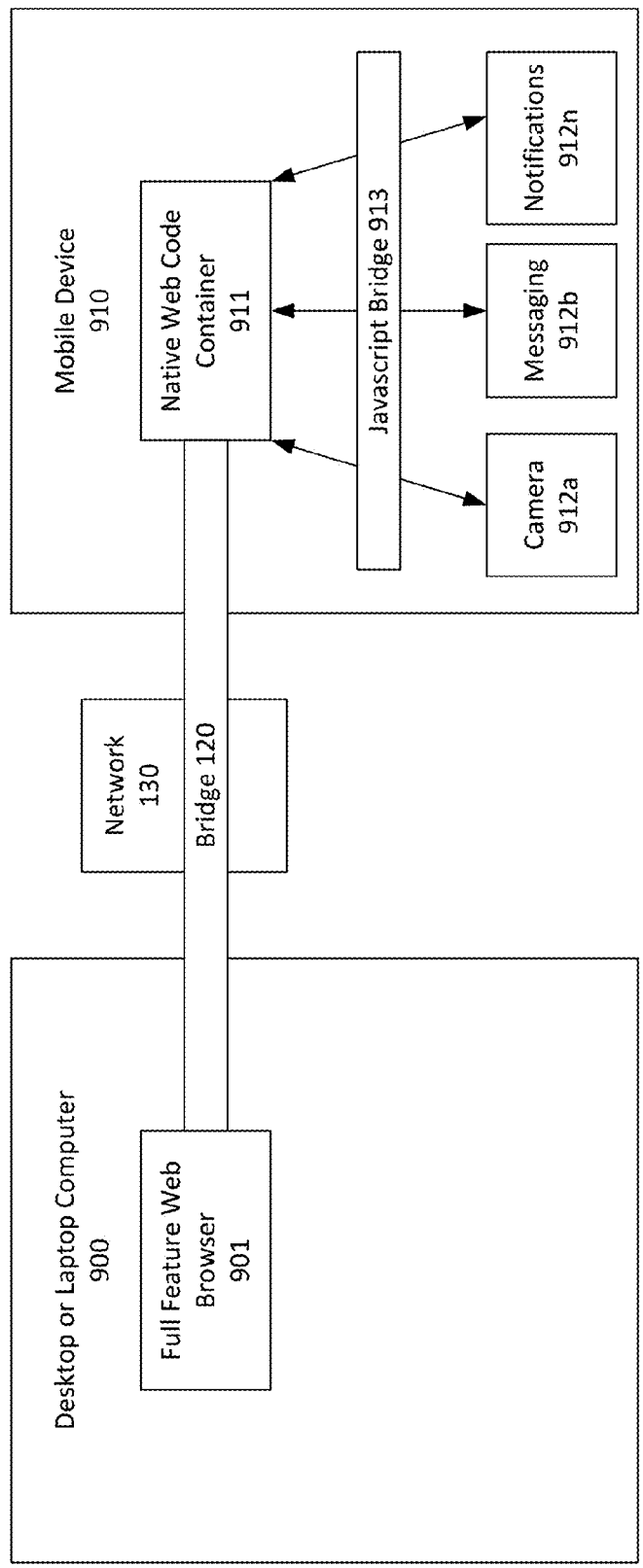
FIG. 2 is a diagram illustrating an example hybrid mobile application development environment in accordance with the present disclosure.

FIG. 2 illustrates one example embodiment of a hybrid mobile application development environment in accordance with the present disclosure. FIG. 2 is intended to provide an example of what the system of FIG. 1 may include when functionality is being specifically developed for a hybrid mobile application, which, upon completion of its development, will be executed in a mobile device environment such as a smart phone or tablet. Depending upon the stage of its development, native web code container 911 may, in some cases, include an application shell with minimal additional functionality. As shown in FIG. 2, desktop or laptop computer 900 is employed to provide the functionality described above in association with extended capability development device 100. Additionally, a mobile device 910 is employed to provide the functionality described above in association with limited capability development device 110. Desktop or laptop computer 900 executes full feature web browser 901, which provides the functionality described above in association with extended capability bridged application 101. Mobile device 910 executes native web code container 911, which provides the functionality described above in association with native code container 111. In the example of FIG. 2, the hybrid mobile application employs a Javascript code base, and, therefore, a JavaScript bridge 913 is employed to provide the functionality described above in association with interface layer 113. As should be appreciated, however, any number of programming languages other than JavaScript may be employed. Native web code container 911 and JavaScript bridge 913 provide access to native device resources including camera 912a, messaging capabilities 912b and notifications 912n. As should also be appreciated, any number of additional or alternative native device resources may interact with native web code container 911.

Figure 3:
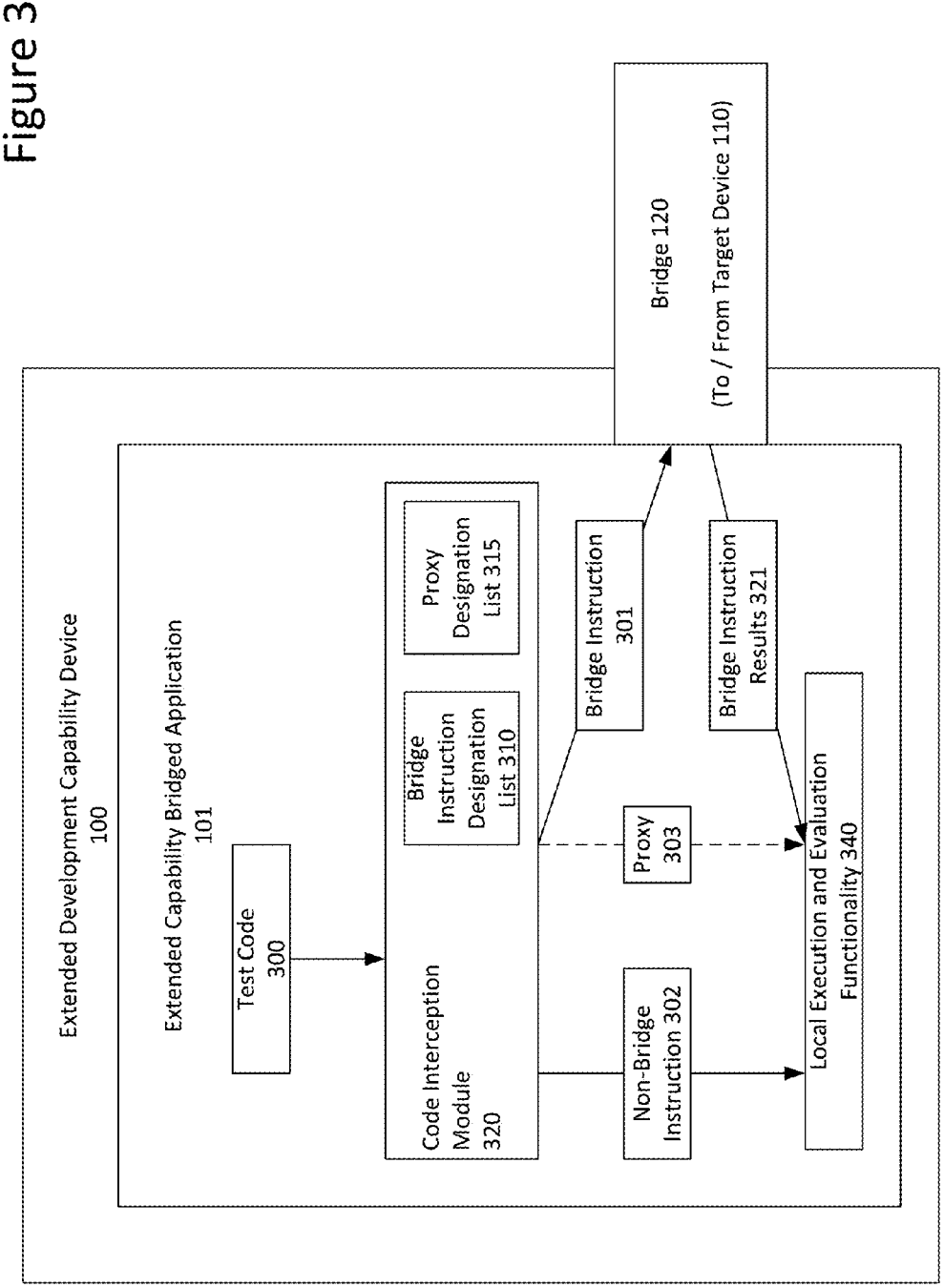
FIG. 3 is a diagram illustrating an example test code execution architecture in accordance with the present disclosure.

FIG. 3 illustrates one example embodiment of a test code execution architecture in accordance with the present disclosure. As should be appreciated, although FIG. 3 depicts only a single extended capability application 101, the functionality described in connection with this application may in some cases be distributed across multiple applications or components. Extended capability development device 100 may be used to generate, modify and store test code 300. In some scenarios, any number of other devices may also be used to generate, modify and store test code 300 prior to providing it to extended capability development device 100. Test code 300 may correspond to an entire application or to only certain functionality within an application. Test code 300 may correspond to new functionality or to functionality that is being updated or otherwise modified. Test code 300 may be written using any of one or more suitable programming languages. Test code 300 may be written, for example, using combinations of JavaScript, cascading style sheets (CSS) and/or hypertext markup language (HTML).

Test code 300 includes a number of instructions that may be executed and evaluated in order to verify that the code is successfully performing as intended. As set forth above, bridge 120 enables certain desired instructions within test code 300 to be sent to the target device 110 for execution. The instructions that are intended for execution at target device 110 are referred to herein as bridge instructions 301, while the remaining calls that are intended for execution locally on extended capability development device 100 are referred to as non-bridge instructions 302.

Instructions intended for execution by target device 110 may be designated as bridge instructions 301 using, for example, bridge instruction designation list 310. In some cases, bridge instruction designation list 310 may list a number of specific individual calls. However, it is not required that every desired bridge instruction 301 be individually identified in list 310. For example, in some cases, bridge instruction designation list 310 may designate bridge instructions 301 based on certain classes, objects or other groupings. For example, in some cases, bridge instruction designation list 310 may include a list of one or more objects. In such cases, each instruction that extends from or is otherwise associated with the listed objects may then be designated as a bridge instruction 301.

In some cases, bridge instructions 301 may be identified based on information provided by a service or other entity external to the extended development capability device 100. For example, in one scenario, the target device 110 and/or the extended development capability device 100 may include a middleware component that is provided by an external service. The middleware component may be remotely updated to provide updated sets of bridge instructions 301 and other updated interfaces for interacting with the target device 110. Thus, the bridge instructions 301 may be provided by an external service without the need for developers to invest the time and effort required to identify and implement the bridge instructions 301. Additionally, in one scenario, a target device 110 may be inspected by the middleware component or another component to identify any provided bridge instructions 301 that are not supported by that particular target device 110. For example, if some provided bridge instructions 301 correspond to camera functionality and the particular target device 110 doesn't have a camera, then the camera instructions may be designated as non-supported instructions. The non-supported instructions may then be removed from the set available bridge instructions 301, thereby preventing an attempted execution of the non-supported instructions, which could potentially fail and break execution of test code 300. The target device 110 may provide any appropriate information regarding bridge instructions 301 to the extended development capability device 100. Additionally, in some cases, an external and/or remote entity may possess and/or provide access to the target device 110 or associated functionality. Thus, it may not be necessary for a particular developer have an actual target device 110 in the developer's possession. This may be particularly advantageous, for example, when a developer is testing functionality for a large number of different target devices 110.

In some cases, bridge instructions 301 may be designated for multiple types of operations across multiple native resources 112a-n. For example, in addition to the text messaging operations described above, bridge instructions 301 may be designated for interacting with the phone, camera, contacts, notifications, calendar and/or any other type of native resource 112a-n. In other cases, bridge instructions 301 may be designated for interacting with only a particular resource 112 or for performing only a particular type of operation.

Additionally, in some cases, bridge instructions 301 may be designated for multiple types of devices and/or operating systems. For example, bridge instructions 301 may be designated for execution on multiple types of devices such as smart phones, tablets, televisions, appliances and other devices. These multiple device types may execute any number of different operating systems from any number of different developers. In other cases, bridge instructions 301 may be designated only for specific device types or only for specific operating systems.

In addition to bridge code designation list 310, a proxy designation list 315 may also be employed. As should be appreciated, lists 310 and 315 need not necessarily be separate lists and may be stored together in a single table, code listing or file and possibly incorporated within or otherwise associated with test code 300. Proxy designation list 315 identifies one or more proxies 303 for use with each designated bridge instruction 301. Essentially, a proxy 303 includes data that serves as a placeholder for the results 321 of an executed bridge instruction 301. The temporary nature of proxy 303 is indicated by the dashed line extending from code interception module 320. The proxy 303 may assist to maintain the stability of local execution and evaluation functionality 340 while the bridge instruction 301 is being executed by the target device 110. Each proxy 303 may be used until a respective bridge instruction 301 is executed by the target device 110 and the actual results 321 of the bridge instruction 301 are returned back to the extended development capability device 100 over the bridge 120.

In the example of FIG. 3, during execution of test code 300, code interception module 320 may be employed to identify and intercept each designated bridge instruction 301. In order to perform these operations, code interception module 320 may have access to bridge instruction designation list 310. As should be appreciated, code interception module 320 need not necessarily be a distinct module or component and may be, in some cases, incorporated within or otherwise associated with test code 300. Generally, code interception module 320 routes each identified bridge instruction 301 for transmission over bridge 120 for execution by the target device 110. On the other hand, each non-bridge instruction 302 is not intercepted and is executed locally by the extended capability bridged application 101. Code interception module 320 may also insert a proxy 303 for each identified bridge instruction 301. Thus, code interception module 320 may also have access to proxy designation list 315.

As set forth above, when a bridge instruction 301 is routed over bridge 120, execution of the bridge instruction 301 is attempted by target device 110. In particular, referring back to FIG. 1, bridge instruction 301 may be executed by native code container 111. In many cases, execution of the bridge instruction 301 may require interaction with one or more of native resources 112a-n. If necessary, native code container 111 may employ one or more interfaces 113 for interaction with any of the one or more native resources 112a-n.

Upon execution of a bridge instruction 301 by native code container 111, the results 321 of the execution may be returned to the extended development capability device 110 using bridge 120. For example, if execution of the bridge instruction 301 is completed successfully, then results 321 may include an indication of the success of the attempt and any relevant resulting information. By contrast, if execution of the bridge instruction 301 could not be successfully completed, then results 321 may include a failure message and any relevant resulting information.

After being transmitted over bridge 120, the results 321 may then be received by extended capability bridged application 101 and incorporated as necessary into the code execution process. For example, if a proxy 303 is employed to serve as a temporary placeholder for results 321, then the proxy 303 may be removed and substituted with the actual results 321. Additionally, the reception of results 321 may trigger performance of various actions such as, for example, updating of any associated data values or display of error messages. Furthermore, any code that was blocked from execution until completion of the bridge instruction 301 may be unblocked when the results 321 are received.

The designated bridge instructions 301 may include any number of synchronous and/or asynchronous instructions. Essentially, synchronous bridge instructions may block the execution of test code 300 until the bridge call is executed by the target device 110 and the actual results of the bridge instruction are returned back to the extended development capability device 100 over the bridge 120. Thus, when a synchronous bridge instruction is being executed, test code 300 may be blocked from having a subsequent instruction executed. When the results of a synchronous bridge instruction are returned over bridge 120, test code execution may then resume and subsequent instructions may be executed.

By contrast, asynchronous bridge instructions 301 do not block execution of test code 300. Thus, when an asynchronous bridge instruction is being executed, subsequent calls within test code 300 may also be simultaneously executed. When the results of an asynchronous bridge instruction 301 are returned over bridge 120, they may be incorporated into the test code execution process as necessary. In many cases, asynchronous bridge instructions 301 may be preferred over synchronous bridge instructions 301 because the asynchronous bridge instructions 301 do not block code execution and, therefore, may be more stable with respect to test code execution. For example, if a lengthy malfunction occurs at target device 110 that renders the device unable to execute a synchronous bridge instruction 301, then this could result in an extended blockage of test code execution. However, while asynchronous bridge instructions 301 may be preferred in some cases, both synchronous and asynchronous bridge instructions 301 may be employed, and proxies 303 may be generated such that they enable support for both synchronous and asynchronous bridge instructions 301.

Figure 4:
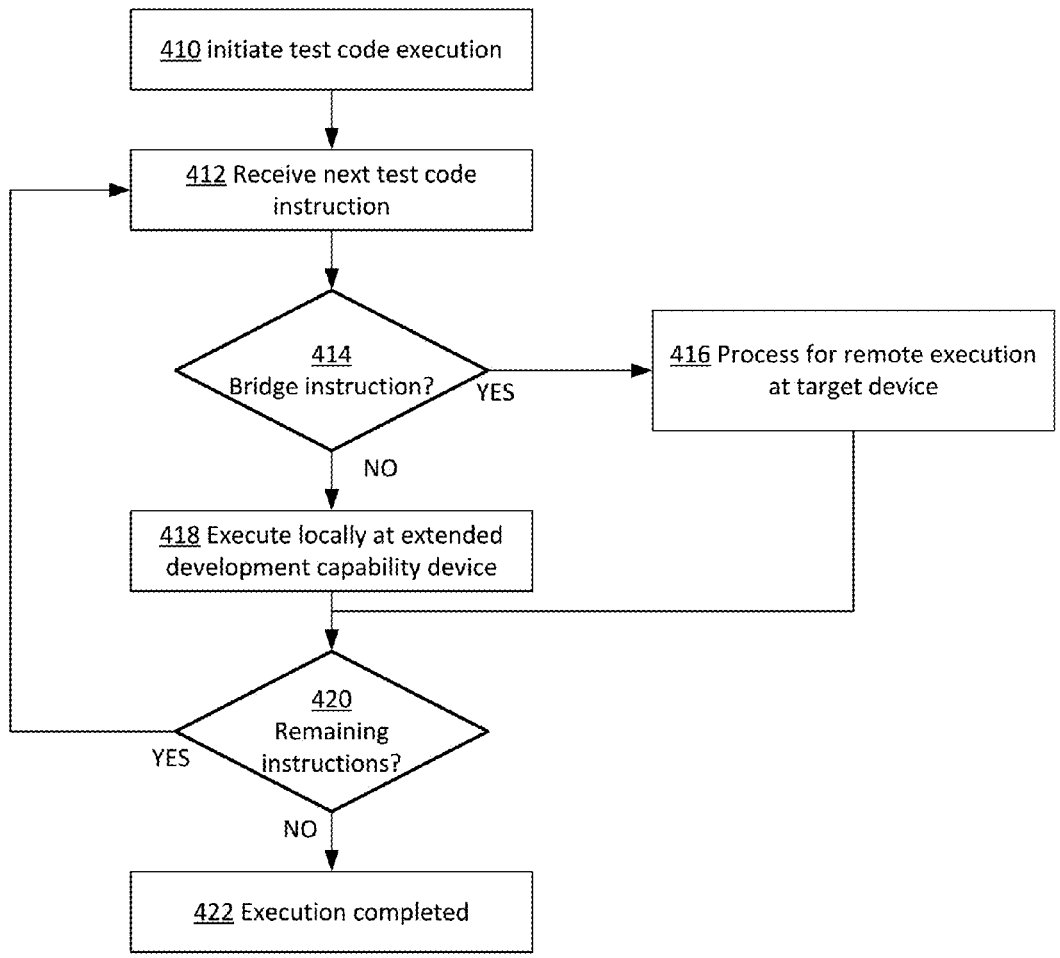
FIG. 4 is a flowchart depicting an example procedure for test code execution in accordance with the present disclosure.

FIG. 4 is a flowchart depicting an example procedure for test code execution in accordance with the present disclosure. At operation 410, test code execution is initiated by the extended development capability device 100. The test code execution process may be initiated based on, for example, receiving a user command. If the test code 300 includes one or more bridge instructions 301, then bridge 120 may be established with the target device 110 in order to enable execution of the bridge instructions 301. In some cases, bridge 120 may be established prior to the initiation of test code execution. In other cases, the establishment of bridge 120 may be triggered by the initiation of test code execution. In yet other cases, establishment of bridge 120 may be delayed until such time as a designated bridge instruction has actually been identified within the test code 300 (see, for example, operation 414, which is described below).

At operation 412, code interception module 320 receives the next instruction within the test code 300. For example, upon the first iteration of operation 412, the first test code instruction may be received, and, upon the second iteration of operation 412, a subsequent test code instruction may be received. At operation 414, code interception module 320 evaluates the next instruction to determine whether or not it is a bridge instruction 301. As set forth above, a bridge instruction 301 may be identified based on bridge instruction designation list 310. As also set forth above, the bridge instruction designation list 310 may list a number of specific individual calls and/or may designate bridge instructions 301 based on certain classes, objects or other groupings. For example, in some cases, bridge instruction designation list 310 may identify an object, and each call that extends from or is otherwise associated with the listed object may then be designated as a bridge instruction 301.

Figure 5:
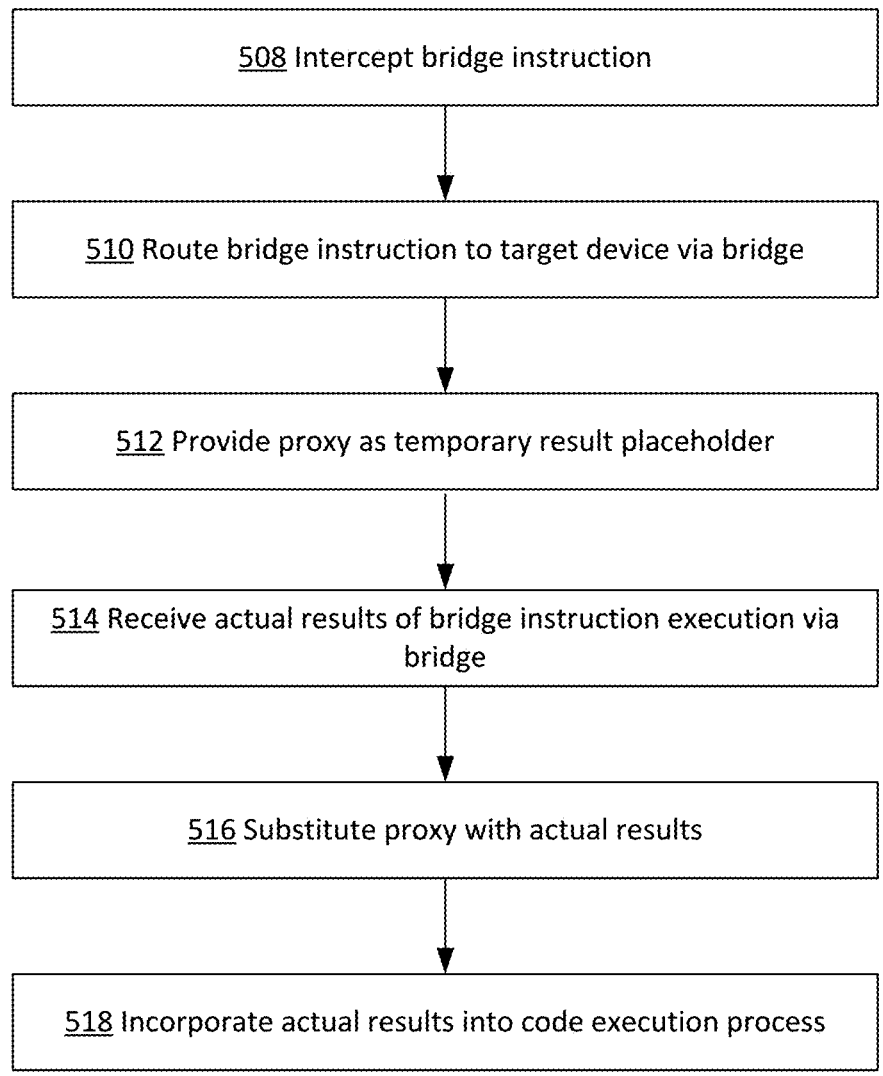
FIG. 5 is a flowchart depicting an example procedure for bridge instruction processing in accordance with the present disclosure.

If the received instruction is identified as a bridge instruction 301, then, at operation 416, the bridge instruction 301 is processed by the extended development capability device 100 for remote execution at the target device 110. An example of a procedure for performance of operation 416 is illustrated in FIG. 5 and described in detail below. If, on the other hand, the received instruction is a non-bridge instruction 302, then, at operation 418, the non-bridge instruction is executed locally by the extended development capability device 100. At operation 420, it is determined whether there are any remaining instructions in test code 300. If so, then the process returns to operation 412, where code interception module 220 receives the next instruction within the test code 300. If, on the other hand, there are no remaining instructions, then the process is completed at operation 422.

FIG. 5 is a flowchart depicting an example procedure for bridge instruction processing in accordance with the present disclosure. Generally, as set forth above with respect to FIG. 4, each received instruction within test code 300 may be evaluated by code interception module 320 to determine whether or not the instruction is a bridge instruction 301 (see operation 414 of FIG. 4). If the received instruction is a bridge instruction 301, then the bridge instruction 301 is processed for execution at the target device 110 (see operation 416 of FIG. 4) using a procedure such as the procedure of FIG. 5.

In greater detail, at operation 508, the identified bridge instruction 301 is intercepted for re-routing by code interception module 320. At operation 510, code interception module 320 routes the identified bridge instruction over bridge 120 for execution at the target device 110. The bridge 120 may be a previously established bridge or, if not previously established, may be established based on the determination that the instruction is a designated bridge instruction 301. The bridge 120 may be, for example, a TCP socket bridge or other appropriate connection that enables the bridge instruction 301 to be transmitted from the extended capability device 100 to the limited capability device 110 for execution. As set forth above, after transmission of the bridge instruction 301 over bridge 120, the bridge instruction 301 may be executed by native code container 111. In many cases, execution of the bridge instruction 301 may require interaction with one or more of native resources 112a-n. If necessary, native code container 111 may employ one or more interfaces 113 for interaction with any of the one or more native resources 112a-n.

At operation 512, code interception module 320 may provide a proxy 303 as a placeholder for the actual results 321 of bridge instruction 301. The proxy 303 may be identified based on proxy designation list 315. The proxy 303 may be employed to maintain stability of test code execution while bridge instruction 301 is being executed by the target device 110.

At operation 514, the results 321 of the bridge instruction execution at the target device 110 are received by extended development capability device 100 over bridge 120. As set forth above, if the bridge instruction 301 is executed successfully, then results 321 may include an indication of the success of the attempt and any relevant resulting information. By contrast, if the bridge instruction 301 could not be successfully executed, then results 321 may include an indication of the failure of the attempt and any relevant resulting information.

At operation 516, proxy 303 is substituted for the actual received results 321. At operation 518, the results 321 are incorporated as necessary into execution of the test code. For example, the reception of results 321 may trigger performance of various actions such as, for example, updating of any associated data values or display of error messages. Furthermore, any operations that were blocked from execution until completion of the bridge instruction 201 may be unblocked when the results 221 are received.

After execution of test code 300 as described, for example, with respect to FIGS. 4 and 5 above, the results of the test code execution may be evaluated by developers or other users to determine the next steps for the development process. In particular, if the execution of bridge instructions 301 at the target device 110 resulted in any errors, then, in some cases, the capabilities of extended development capability device 100 may be employed, at least in part, to debug and correct such errors. For example, code breakpoints may be employed on the extended development capability device 100 to debug and correct errors. As part of this process, extended development capability device 100 may be used to modify the test code and to re-execute the modified test code as desired.

Upon completion of the development process, the developed functionality may be made available to consumers or other users via one or more communications networks or other distribution mechanisms. As examples, functionality may be downloaded by multiple devices via a local area network (LAN) or a wide area network (WAN) such as the Internet. In particular, functionality for hybrid mobile applications is commonly distributed via the Internet from a server to a client application on a mobile device.

Figure 6:
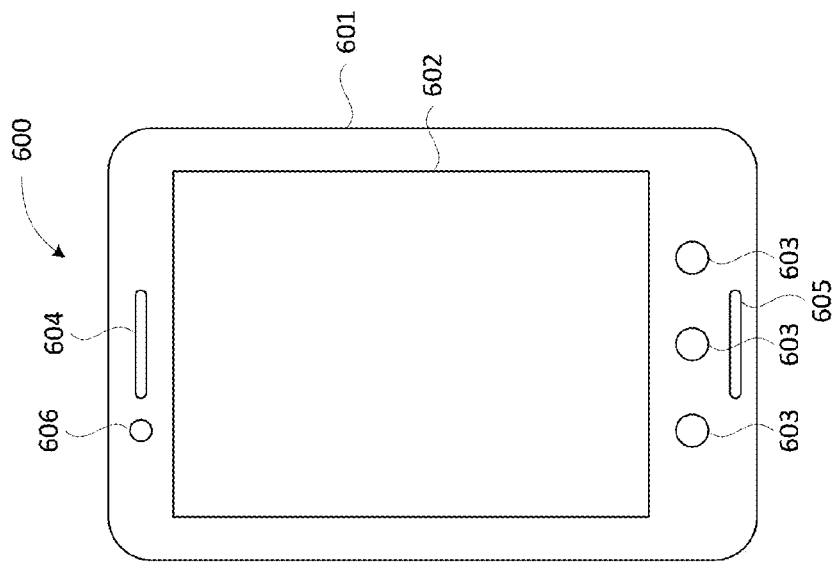

As set forth above, the disclosed techniques may employ the use of an extended development capability device in communication with a target device. Some example embodiments for the extended development capability device and/or the target device will now be described in detail. In particular, FIG. 6 depicts an embodiment of an exterior of a computing device 600. It should be understood that this is merely an example for discussion, and that a number of additional components, configurations, assemblies and combinations are possible as known in the art. Computing device 600 can be any one of a variety of forms, such as a desktop computer or laptop computer, a tablet computing device, a cell phone, a handheld computing device or any other form of computing device. Computing device 600 can include a housing 601. The housing 601 can be made of any material or combinations of materials, such as various types of plastic, metal, glass and combinations thereof, that is suitable to house the components of device 600. Computing device 600 can also include a display 602 that can display images, text, any other type of visual information and any combination thereof. Display 602 can also be a touchscreen display that is capable of sensing the presence and location of one or more touches of the display 602. A touchscreen display can sense touches by a user, such as a touch by a finger or a hand, and touches by objects, such as a stylus. Display 602 can be part of a user interaction system of the computing device 600.

Computing device 600 can also include one or more hard buttons 603 integrated into housing 601. In one embodiment, the one or more hard buttons 603 can include a single button, such as a home button or a power button. In another embodiment, the one or more hard buttons 603 can include a small set of buttons, such as a power button, a home button and a back button. In yet another embodiment, the one or more hard buttons 603 can include a large set of buttons, such as a full QWERTY keyboard, a keypad and the like. The one or more hard buttons 603 can be part of the user interaction system of the computing device 600.

Computing device 600 can also include a speaker 604 configured to emit sounds and a microphone 605 configured to receive sounds. In the embodiment where computing device 600 is a cell phone, speaker 604 and microphone 605 can be used to carry on a telephone call. In one embodiment, speaker 604 can be configured to play sounds associated with graphics displayed on display 602, such as during play of audiovisual material on computing device 600. In another embodiment, microphone 605 can receive audio sounds which the computing device 600 can interpret as user inputs. In addition, while not depicted in FIG. 6, computing device 600 can also include an audio port which can be connected to an external microphone and/or an external speaker or speakers. Computing device 600 can send and receive audio signals via the audio port and interpret the received audio signals via the audio port just as it would interpret audio signals generated from sounds received by the microphone 605.

Computing device 600 can also include one or more optical devices 606. In one embodiment, an optical device can include an optical sensor, such as an infrared sensor, a visible light sensor and/or any device that can sense light and/or electromagnetic energy. The detection of light and/or electromagnetic energy can be used by the computing device 600 to control components of the computing device 600, such as a level of light emitted by a backlight of display 602, illumination of one or more hard keys 603 and any other aspect of computing device 600. In another embodiment, an optical device can include an image-capturing device, such as a digital camera. An image-capturing device can include any device configured to capture an image, such as a complementary metal-oxide-semiconductor (CMOS) active pixel sensor (APS) and a charged coupled device (CCD). Images captured by one or more optical devices 606 can be stored by the computing device 600 as individual image or as a series of images in a video. Individual images and/or video images can be processed by computing device 600 and interpreted as user inputs. While FIG. 6 depicts one optical device 606 pointing in the same direction as the display 602, it is possible for computing device 600 to have any number of optical devices 606 and it is possible for one or more optical devices 606 to be pointed in other directions, such as a rear-facing camera pointing in the opposite direction of display 602.

Figure 7:
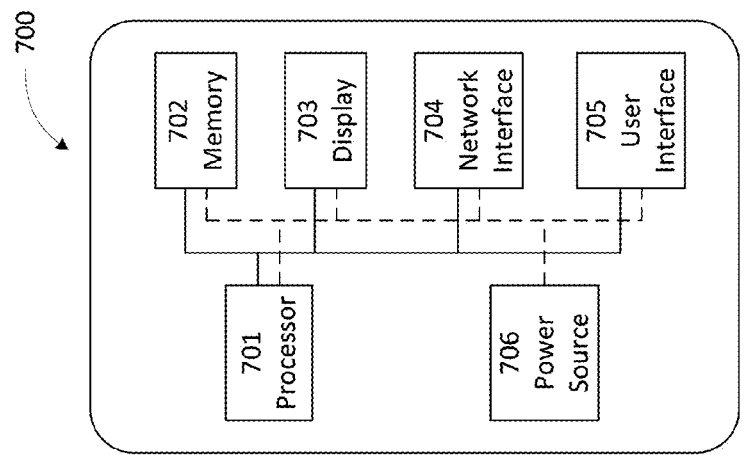
FIGS. 6 and 7 depict embodiments of external and internal components of a computing device.

FIG. 7 depicts an embodiment of internal components of a computing device 700. It should be understood that this is merely an example for discussion, and that a number of additional components, configurations, assemblies and combinations are possible as known in the art. Computing device 700 can include at least one processor 701 that is able to execute instructions stored in one or more memories 702. The one or more memories 702 can include instructions for running an operating system, instructions for running applications within the operating system, a system management agent and any other kind of instructions. The at least one processor 701 can generate information on a display component 703. Display component 703 can include one or more of a display driver, a display card, display 602 or any other hardware and/or software required to display an image or series of images. Computing device 700 can also include a network interface 704 that allows the device to send and receive information signals via a network. Network interface 704 can include any type of network adapter for connecting to a network, such as an adapter to establish a connection to the Internet, to a wired or wireless intranet, to a cellular network or to a wireless network. Computing device 700 can also include a user interface 705. User interface 705 can include one or more components, such as display 602, one or more hard buttons 603, speaker 604, microphone 605 and optical devices 606, that can provide information to a user and/or receive inputs from a user. User interface 705 can also include one or more external components, such as an external keyboard, external mouse, external microphone, external speaker and the like.

Computing device 700 can include at least one power source 706. Power source 706 can provide power to any or all of the other components in computing device 700. As depicted in FIG. 7, power source 706 can be connected to, and provide power to, each of processor 701, memory 702, display 703, network interface 704 and user interface 705. Power source 706 can be any type of power source, such as one or more disposable batteries, a rechargeable battery and the like. In the embodiment where computing device 700 is a portable device, such as a laptop computer, a tablet computer, a cell phone, a hand held computer and the like, the power supply 706 may need to provide power for a period of time between recharging of the power source 706. In other embodiments, computing device 700 can be a desktop computer, workstation, server or other non-portable device that is typically connected to an external power source any time that computing device 700 is active. With such computing devices, certain elements, such as a display, user interface components and the like may also be external to the computing device.

Figure 8:
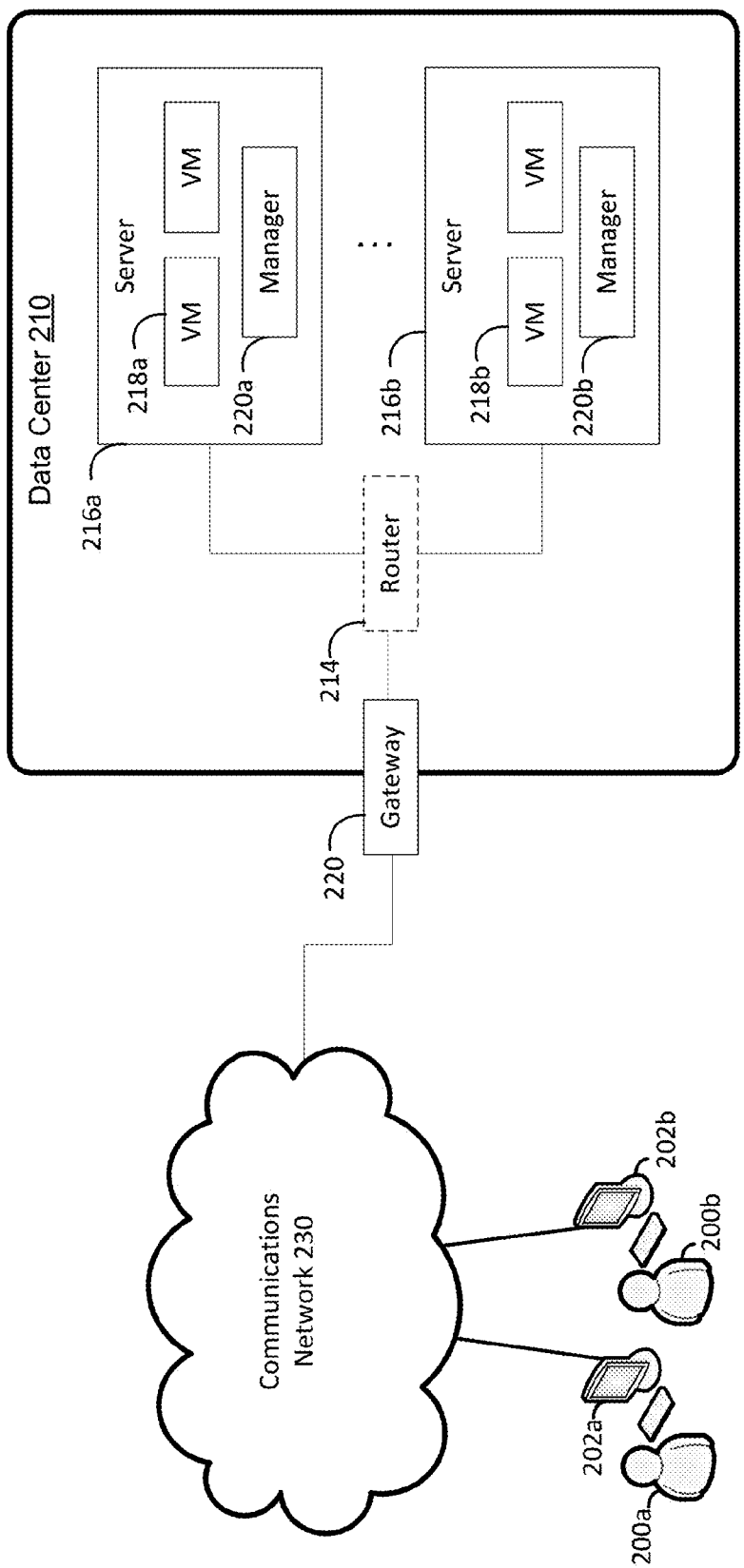
FIG. 8 is a block diagram illustrating an example computer system that may be used in some embodiments.

As set forth above, after completion of the debugging process, developed functionality may be distributed to one or more customers or other users operating one or more target devices. Some example embodiments for a computing environment that may be used to distribute the developed functionality to target devices will now be described in detail. In particular, FIG. 8 illustrates an example computing environment in which the embodiments described herein may be implemented. FIG. 8 is a diagram schematically illustrating an example of a data center 210 that can provide computing resources to users 200*a* and 200*b* (which may be referred herein singularly as user 200 or in the plural as users 200) via user computers 202*a* and 202*b* (which may be referred herein singularly as computer 202 or in the plural as computers 202) via a communications network 230. Data center 210 may be configured to provide computing resources for executing applications on a permanent or an as-needed basis. The computing resources provided by data center 210 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of computing resource may be available in different sizes, such as large resources—consisting of many processors, large amounts of memory, and/or large storage capacity—and small resources—consisting of fewer processors, smaller amounts of memory, and/or smaller storage capacity. Customers may choose to allocate a number of small processing resources as Web servers and/or one large processing resource as a database server, for example.

Data center 210 may include servers 216a-b (which may be referred herein singularly as server 216 or in the plural as servers 216) that provide computing resources available as virtual machine instances 218a-b (which may be referred herein singularly as virtual machine instance 218 or in the plural as virtual machine instances 218). The virtual machine instances 218 may be configured to execute applications, including Web servers, application servers, media servers, database servers and the like. Other resources that may be provided include data storage resources (not shown), and may include file storage devices, block storage devices and the like.

The availability of virtualization technologies for computing hardware has provided benefits for providing large scale computing resources for customers and allowing computing resources to be efficiently and securely shared between multiple customers. For example, virtualization technologies such as those provided by VMW or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 8, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box, or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216 shown in FIG. 8 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as instance manager 220 or in the plural as instance managers 220) capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 8, a router 214 may be utilized to interconnect the servers 216a and 216b. Router 214 may also be connected to gateway 220, which is connected to communications network 230. Router 214 may manage communications within networks in data center 210, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 210 described in FIG. 8 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method performed by an extended development capability device, the computer-implemented method comprising:
   establishing a bridge between the extended development capability device and a target device comprising a native code container providing limited development capability;

receiving a command to execute code, wherein the code includes one or more bridge instructions and one or more non-bridge instructions, wherein the bridge instructions are designated for execution on the target device;

sending, over the bridge, each bridge instruction within the code to the target device for execution of the bridge instruction at the target device by the native code container;

providing a proxy value for each bridge instruction as a placeholder associated with execution of the bridge instruction during execution of the bridge instruction at the target device; and executing locally each remaining non-bridge instruction within the code.

2. The computer-implemented method of claim 1, further comprising:

receiving over the bridge a result of execution of each bridge instruction from the target device.

3. The computer-implemented method of claim 2, further comprising:

after receiving the result of the execution of each bridge instruction, replacing the proxy value with the result of the execution of the bridge instruction, wherein the proxy value assists with maintaining stability of execution of the code.

4. The computer-implemented method of claim 1, wherein at least one of the bridge instructions is identified based on information associated with a plurality of different native resources on the target device.

5. The computer-implemented method of claim 1, wherein at least one of the bridge instructions is identified based on information associated with a plurality of different operating systems.

6. The computer-implemented method of claim 1, wherein at least one of the bridge instructions is identified based on information received from a service external to the extended development capability device.

7. The computer-implemented method of claim 1, wherein at least one of the bridge instructions is identified based on information obtained from an inspection of features supported by the target device.

8. The computer-implemented method of claim 1, wherein the code comprises functionality developed for execution within a hybrid mobile application.

9. A computing system for testing code comprising:

one or more processors; and one or more memories having stored therein computer instructions that, upon execution by the one or more processors, cause the computing system to perform operations comprising:

establishing a bridge between an extended development capability device and a target device comprising a native code container providing limited development capability;

receiving a command to execute the code, wherein the code includes one or more bridge instructions and one or more non-bridge instructions, wherein the bridge instructions are designated for execution on the target device;

sending, from the extended development capability device over the bridge, each bridge instruction within the code to the target device for execution of the bridge instruction at the target device by the native code container;

providing a proxy value for each bridge instruction as a placeholder associated with execution of the bridge instruction during execution of the bridge instruction at the target device; and executing locally at the extended development capability device each remaining non-bridge instruction within the code.

10. The computing system of claim 9, wherein the operations further comprise:

receiving over the bridge a result of execution of each bridge instruction from the target device.

11. The computing system of claim 10, wherein the operations further comprise:

after receiving the result of the execution of each bridge instruction, replacing the proxy value with the result of the execution of the bridge instruction, wherein the proxy value assists with maintaining stability of execution of the code.

12. The computing system of claim 9, wherein at least one of the bridge instructions is identified based on information associated with a plurality of different native resources on the target device.

13. One or more non-transitory computer-readable storage media having stored thereon instructions that, upon execution by one or more processors of an extended development capability device, cause the extended development capability device to at least:

establish a bridge between the extended development capability device and a target device comprising a native code container providing limited development capability;

receive a command to execute code, wherein the code includes one or more bridge instructions and one or more non-bridge instructions, wherein the bridge instructions are designated for execution on the target device;

send, over the bridge, each bridge instruction within the code to the target device for execution of the bridge instruction at the target device by the native code container;

provide a proxy value for each bridge instruction as a placeholder associated with execution of the bridge instruction during execution of the bridge instruction at the target device; and execute locally each remaining non-bridge instruction within the code.

14. The one or more non-transitory computer-readable storage media of claim 13, having further stored thereon instructions that, upon execution by the one or more processors of the extended development capability device, cause the extended development capability device to at least:

receive over the bridge a result of execution of each bridge instruction from the target device.

15. The one or more non-transitory computer-readable storage media of claim 14, having further stored thereon instructions that, upon execution by the one or more processors of the extended development capability device, cause the extended development capability device to at least:

after receiving the result of the execution of each bridge instruction, replace the proxy value with the result of the execution of the bridge instruction, wherein the proxy value assists with maintaining stability of execution of the code.

16. The one or more non-transitory computer-readable storage media of claim 13, wherein at least one of the bridge instructions is identified based on information associated with a plurality of different native resources on the target device.

17. The one or more non-transitory computer-readable storage media of claim 13, wherein at least one of the bridge instructions is identified based on information associated with a plurality of different operating systems.

18. The one or more non-transitory computer-readable storage media of claim 13, wherein at least one of the bridge instructions is identified based on information received from a service external to the extended development capability device.

19. The one or more non-transitory computer-readable storage media of claim 13, wherein at least one of the bridge instructions is identified based on information obtained from an inspection of features supported by the target device.

20. The one or more non-transitory computer-readable storage media of claim 13, wherein the code comprises functionality developed for execution within a hybrid mobile application.

* * * * *